E. P. CAMUS.
FIELD GLASS FOR FIREARMS.
APPLICATION FILED APR. 20, 1917.
1,272,214.
Patented July 9, 1918.
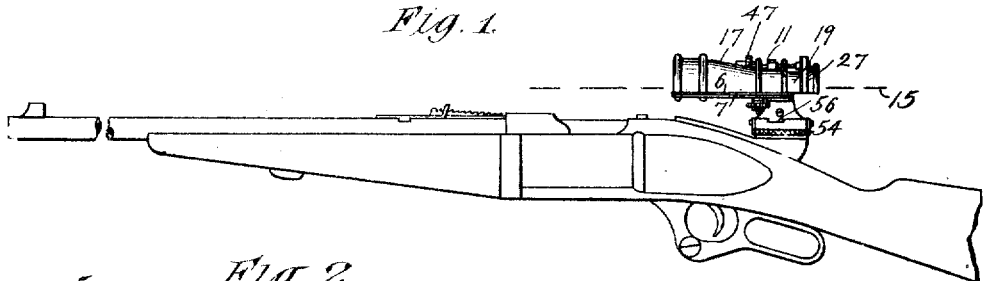
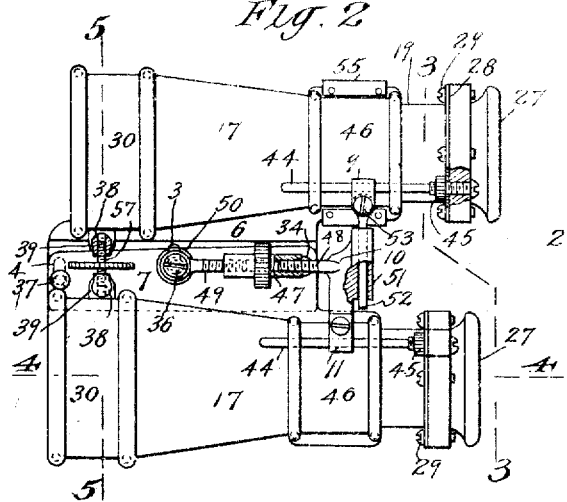
Inventor:
Eugene P. Camus.

UNITED STATES PATENT OFFICE.

EUGENE P. CAMUS, OF BROOKLYN, NEW YORK.

FIELD-GLASS FOR FIREARMS.

1,272,214.  Specification of Letters Patent.  Patented July 9, 1918.

Application filed April 20, 1917. Serial No. 163,441.

*To all whom it may concern:*

Be it known that I, EUGENE P. CAMUS, a citizen of the United States, and a resident of the city of New York, borough of Brooklyn, in the county of Kings and State of New York, have invented new and Improved Field-Glasses for Firearms, of which the following is a full, clear, and exact description.

My invention relates to the improvements in field glasses and their new use in connection with firearms. An object thereof is to give to the user of firearms means to see the object he is aiming at with his firearm in clear, enlarged form directly over his sighting line, utilizing the left eye to assist the right eye and improve the magnified image of the telescopes by converging mechanically the optical center lines of the telescopes to the point of the target at a predetermined range and, by blending both magnified images into one, thus obtaining a sharp image visible under different conditions of atmosphere and light. Another object of the invention is to bring the most direct and effective rays of the central part of the lenses nearer to the firearm's sight line by the use of major segment lenses in field glasses, thus reducing the possibility of losing the target position while changing from the firearm sighting to the optically magnified target point or vice versa.

Still another object is a quickly operating device in field glasses for adjustments of interpupillary distance of eye pieces and of relative lateral convergence of the axes of the two telescopes, combined with a provision in construction to withstand the violent jerks of the recoil of the firearm without changing the set adjustments.

It is also the purpose of this invention to provide an inexpensive durable construction in field glasses and non-metallic casings for lenses protecting them from breaking.

In field glasses for ordinary use in observation, the two telescopes aline approximately parallel and, by placing both eyes close to the eye piece lenses, the convergence and blending of the two magnified images is obtainable automatically. When, however, field glasses are to be used in combination with a firearm of high power, lenses can not be placed so near to the eyes because a distance of two inches or more must separate the eyes from the eye piece lenses to protect the eyes from possible injury from the recoil of the firearm. Also, the field glasses must coöperate with sights and eye sight lines in direction and convergence to one point of the target for contrasting ranges, as in the woods, fog, or in the open, necessitating more accurate adjustments than in ordinary field glasses, for interpupillary distance of eye pieces and suitable convergence of the axes of the telescopes. The telescopes are set in such a manner as to place the image of the magnified point of the target in the center of both fields, and by that adjustment, insure a perfect blending of the magnified images into one with its center corresponding with the firearm sight's target point, located on the same perpendicular line, thus facilitating in finding quickly the magnified or the unmagnified point of the target, while holding the firearm in a position ready to shoot.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and in which:

Figure 1 is a side elevation of a rifle provided with an embodiment of my invention;

Fig. 2 is the top view of the field glasses;

Fig. 3 is a section taken on the line 3—3 of Fig. 2;

Fig. 4 is a longitudinal section taken on the line 4—4 of Fig. 2;

Fig. 5 is a section taken on line 5—5 of Fig. 2;

Fig. 6 is a plan view of the base plates;

Fig. 7 is a detail view of one of the lens casings.

Before proceeding to a more detailed description of my invention, it must be clearly understood that although the field glasses are shown applied to a rifle, the same can be used with any other firearm.

Referring to the drawings, the plates 6 and 7, forming the lower parts of the shells of the field glasses 17, are fastened to the bases of the shells, which are elongated funnel shaped arches, by means of screws 18.

Slidably mounted within the rear part of the shells 17 and coaxial with the optical center lines 15, are the tubular eye piece lens housings 19. The above eye piece lens housings 19 are formed of thin tubing with a lateral flattened portion 20 in engagement with the flat bases 6 and 7. Crimps 22 are formed around the housings 19 to form end seats for fiber lens casings 23 and 24 which hold in their milled out grooves 25, the edges of the eye piece lenses 26.

The beveled ends 21 of the fiber casings 23 and 24, form dustproof seats for the lenses when joined together. Eye shields 27, having a smaller diameter of inside curvature than the tubular part of the eye piece housings 19, form shoulders to hold in place the casings 23 and 24 with eye piece lenses 26, which are inserted from the flanged ends 28 of the tubular housings 19, toward the crimps 22. Eye shields 27 are joined to the flanges 28 of the tubular housings 19, by means of screws 29. The interior of the arched walls, at the front end of the shells 17, form seats 30 for the fiber casings 31 and 32, which hold the objective lenses 33 in their grooves 25.

The plates 6 and 7 are turned over at the front ends, as shown at 8, making seats for the front edges of fiber casings 32, in continuation with seats 30. The objective lenses 33 with casings 31 and 32 are inserted into the seats 30 from the under side of the shells 17, and are securely clamped in place by plates 6 and 7, drawn by screws 18.

The lenses 26 and 33 are ground to form major segments and have their chordal edges and optical centers in close proximity to the open space under the field glasses, utilized for the passage of eye sight and sight lines, in order to obtain the central optical light rays close to and parallel with the said lines.

In the plate 6, part of the surface is depressed to the thickness of plate 7, as shown in Figs. 3 and 5, the plate 7 overlapping the depressed part and is supported by it, maintaining both telescopes on the same level. The plates 6 and 7 are pivoted together at 34, a plurality of holes 35 being provided for adjustment, and are secured together when positioned by bolts 36 and 37, passing through slots 3 and 4 formed in the plate 6. This adjustment provides the proper interpupillary distance between the telescopes. The bolt 34 acts as a pivot to the lateral hinge movement of the plate 7 for altering the relative lateral directions of the optical center lines 15 of the telescopes. The right eye telescope is held stationary over the firearm by the mounting, and has its optical center line 15 alining with the sight line. The left eye telescope is movable on a lateral plane by the manipulation of the right and left thread operating screw 57, engaging corresponding threads of two turnable studs 38, set in perpendicular bores in the projections 39 formed on the shells 17.

The bolts 36 and 37, passing through the plate 7 and through the slotted holes 3 and 4, allow free movement in the hinge action of plates 6 and 7. The bolts 34, 36 and 37 are provided with nuts 40, 41, 42, which serve to tighten the plates 6 and 7 together after the adjustment and hold both telescopes firmly in the desired position.

The eye piece housings 19 are slidably mounted in the shells 17 of the telescopes, for focusing the lenses, by sliding shafts 44, which are rigidly fastened to the eye shields 27 by means of screwed ends and lock nuts 45 and are movable through bores 46 in the end projections of the shells 17, coaxially with the optical center line 15 of the respective telescopes. In the left eye telescope, the shaft 44 is held by friction by clamp 11, part of the T connection 10, and is movable on a parallel line with the center of the bores 46 by the manipulation of the right and left threaded nut 47, which engages at one end the threaded part 48 of the T connection 10 with a corresponding thread. A screw eye 49 is fastened in a suitable manner to the top of a perpendicular stationary post 50, forming part of the bolt 36, said screw eye engaging by its threaded part the other end of the nut 47. The said T connection 10 contains in the cylindrical bore 51, on the transverse line to the axis of the left eye telescope, a slidable shaft 52, movably connected to the clamp 9 by a screw 53, the said screw 53, by turning, tightens the grip of the clamp 9 on the shaft 44 of the right eye telescope.

It is evident that, by the manipulation of the nut 47, both eye pieces 19 move equally to and fro in the projections 46 of the shells 17 and maintain their relative lateral direction, while focusing the lenses.

The focusing can be done in unison or singly for each eye. The eye pieces 19 with sliding shafts 44 are held in position by friction clamps 9 and 11 and are easily released for alterations, by loosening the clamp screws, to suit the individual eye.

The object of putting the left eye telescope slightly in advance of the right telescope is to maintain the eye pieces approximately at the same distance from the eyes and insure the same magnification to the both eyes, while in the posture of aiming the gun.

The interior walls of the field glasses are finished in dull black color, the base plates having a covering of heavy black paper pasted to the upper part of said plates and extending between the seams of the shells, making the telescopes dustproof. The under part of the plates is painted dead black color, to eliminate reflections.

The mounting 54 supports the field glasses over the frame of the firearm by two clamp grips 55, and also has means, through its arcuate dovetail bearings 56, to bring the axis of the right eye telescope in a lateral alinement with the sight line of the firearm. The construction of the mounting 54 is well known and needs no further detailed description.

Having thus described my invention, I claim as new and desire to secure by Letters Patent:

1. The combination with a firearm, of field glasses, a mounting for supporting said field glasses over the frame of said firearm, said field glasses having two major segment telescopes, set side by side and containing major segment lenses therein, each of said telescopes having an extension, both of said extensions overlapping one over the other on a lateral plane, said two extensions being pivoted together by a bolt at the rear end and slidable in hinge action at the front end; means to coact the optical center lines of said telescopes in direction and convergence with unmagnified sights and eye sight lines through the open space under the chordal walls of said telescopes and within the circumferential line of said lenses, by the said hinge movement of said base plate extensions being adapted to alter the directions of the optical center lines of said telescopes.

2. The combination with a firearm, of field glasses, a mounting for supporting said field glasses over the frame of said firearm, said field glasses having two relatively adjustable major segment telescopes, set side by side and each comprising a pair of sections, one of said sections being an arcuate funnel shaped shell, having a flat base plate for a wall on the chordal side of said shell, major segment objective lenses in the forward part and a projection in the rear part thereof; and the other of said sections being an eye piece housing, containing major segment eye piece lenses therein, the said housing being shaped to fit slidably into the said projection; the said mounting being arranged to provide an open space under the chordal walls of said telescopes and within the circumferential line of said lenses, said open space being adaptable for the passage of eye sight lines.

3. The combination with a firearm, of field glasses, a mounting for supporting said field glasses over the frame of the said firearm, said field glasses having two relatively adjustable major segment telescopes, set side by side, and containing optical elements therein, each of the said telescopes comprising a pair of sections, one of said sections being an arcuate funnel shaped shell, a flat base plate forming a chordal wall for the said shell; the said base plate having an extension, said base plate extensions of the said two telescopes pivoted together by a bolt at the rear end and slidable in hinge action at the front end; one of the said telescopes being held stationary by said mounting directly over the frame of the said firearm, with the optical center line of said telescope in alinement with the firearm's sight line and having the base plate extension of the said telescope supporting the extension of the base plate of the other of the said telescopes, the relative convergence of the optical center lines of both telescopes being altered by the lateral hinge movement of the said base plate extensions.

4. In field glasses, the combination with two relatively adjustable major segment telescopes, set side by side, and comprising a pair of sections, one of the said sections being an arcuate funnel shaped shell, with a projection at the front part of said shell, and having a flat base plate forming a chordal wall for the said shell, the said base plate having an extension with a plurality of holes therein, said base plate extensions of the said two telescopes overlapping and slidable one over the other in a lateral hinge movement; a threaded bolt pivoting the said two extensions at the rear end and a right and left thread operating screw at the front end of the said two extensions, two turnable threaded studs, set in perpendicular bores in the said projections of the shells and engaged by the operating screw, said operating screw, by turning, altering the distance between the front ends of the said telescopes to the desired convergence of optical center lines of the said telescopes.

5. In field glasses, the combination with two relatively adjustable major segment telescopes, set side by side, and containing optical elements therein, each of the said telescopes comprising a pair of sections, one of the said sections being an arcuate funnel shaped shell, a flat base plate forming a chordal wall for the said shell, the said base plate having an extension with a plurality of holes therein, said base plate extensions of the said two telescopes overlapping and slidable one over the other in hinge movement in a plane parallel with the axes of the said shells; one threaded bolt, rigidly attached to the upper extension of one of the said base plates, and passing through any one of the holes, bored on a transverse line to the axes of the telescopes, in the rear end of the lower extension of the other of the said base plates; the said holes in conjunction with the said threaded bolt separating the optical centers of the telescopes to the interpupillary distance.

6. In field glasses, the combination with two relatively adjustable major segment telescopes, set side by side, and containing optical elements therein, each of the said telescopes comprising a pair of sections, one of each pair being an arcuate funnel shaped shell, a flat base plate forming a chordal wall for the said shell, the said base plate having an extension with a plurality of holes therein, said base plate extensions of the said two telescopes overlapping and slidable one over the other in hinge movement in a plane parallel with the axes of the said shells; a plurality of threaded bolts passing through the plurality of holes in the said two base plate extensions; said threaded bolts having threaded ends projecting from said extensions; a plurality of threaded nuts engaging said projecting threaded ends; whereby, in turning said nuts, the two said base plate extensions can be clamped together or released.

7. In field glasses, the combination with two relatively adjustable major segment telescopes, set side by side, each comprising two sections, one of each being an arcuate funnel shaped shell and having two end projections at its rear part, with a bore in each of the said end projections, the centers of the said two bores alining with the axes of the respective shells; flat base plates forming chordal walls for the said shells, each of the said base plates having an extension, the two said extensions overlapping and movable one over the other in hinge action in a plane parallel with the axes of said shells; a major segment objective lens in the forward part and a projection at the rear part of each of said shells; and the other section of the said telescopes being an eye piece housing, shaped to fit slidably into the said projection, the said eye piece housing having a major segment eye piece lens therein and carrying an eye shield with a sliding shaft rigidly attached thereon, said shaft being slidable in the said bores of the said two end projections; means for focusing the said eye piece lenses comprising a T connection with two friction clamps thereon, holding by friction the two said sliding shafts, said T connection with one of the said clamps being movable parallel to the axis of one of the two telescopes, a right and left threaded adjustment nut, engaging a threaded end of the said T connection at one end, the other end of the said adjustment nut engaging the threaded part of a screw eye attached to the top of a stationary post, said stationary post being rigidly fastened to the upper extension of the said base plate of the same one of the said telescopes; the said T connection having a cylindrical bore therein on a transverse line to the axes of the telescopes and carrying a sliding shaft in said bore, said shaft being connected to the other of the said friction clamps by a hinge joint, said clamp being adapted in conjunction with said T connection to permit adjustment, while focusing, for the interpupillary distance and relative alinements of the axes of the said two telescopes.

8. In field glasses, the combination with two relatively adjustable major segment telescopes, set side by side and each composed of a pair of sections, one of said sections being an arcuate funnel shaped shell and base plate drawn together by threaded screws, said shell having at the front end a milled out seat therein; fiber casings with grooves holding the objective lenses in said grooves; said shell with the said seat adapted to hold the said fiber casings with said objective lenses therein by the clamping grip around the edges of the said lenses, by means of said shell and said base plate in conjunction with said threaded screws.

EUGENE P. CAMUS.

Witnesses:
SAMUEL J. FREETH,
TESSIE CAMUS.